United States Patent [19]

Carter

[11] 4,054,066
[45] Oct. 18, 1977

[54] LATHE TOOL

[76] Inventor: Walter L. Carter, 17156 Los Alimos, Granada Hills, Calif. 91344

[21] Appl. No.: 681,970

[22] Filed: Apr. 30, 1976

[51] Int. Cl.² .................. B23B 29/00; B26D 1/00
[52] U.S. Cl. ........................... 82/36 R; 407/97
[58] Field of Search ............... 29/96, 97, 98; 82/36 R

[56] References Cited

U.S. PATENT DOCUMENTS

| 1,308,282 | 7/1919 | Gibbs | 82/36 R |
| 1,332,731 | 3/1920 | Kvieger | 82/36 R |
| 2,328,359 | 8/1943 | Ramsdell | 29/96 |
| 2,439,635 | 4/1948 | Ruch | 82/36 R |

FOREIGN PATENT DOCUMENTS

| 1,309,723 | 10/1962 | France | 82/36 R |
| 7,164 of | 1901 | United Kingdom | 29/96 |

*Primary Examiner*—Harrison L. Hinson
*Attorney, Agent, or Firm*—Nilsson, Robbins, Dalgarn, Berliner, Carson & Wurst

[57] ABSTRACT

A tool holder adapted to be mounted on a lathe turret is of rigid, one-piece construction and removably secures any one of a wide range of interchangeable drills of different diameters. The tools are secured at a centerline located at an exact predetermined distance, e.g. 0.375 inch, above the bottom surface of the holder so as to exactly locate the centerline of the tool respective the top surface of the turret. The distal end of the tool holder is spaced fractionally above the base plate of the lathe turret, providing for spring-loading of the tool.

8 Claims, 5 Drawing Figures

U.S. Patent　　　Oct. 18, 1977　　　4,054,066

LATHE TOOL

FIELD OF THE INVENTION

The field of art to which the invention pertains includes the field of machine tools and, more particularly, of drills which are removably supported in a drill holder.

BACKGROUND AND SUMMARY OF THE INVENTION

A variety of devices are known for centering a drill supported in a drill holder in predetermined relation to the workpiece. See, for example, U.S. Pat. Nos. 441,834, 776,250, 1,647,590, 2,035,999 and 2,328,359. It is common practice to use a seating member, inserted into a slot of a lathe turret and secured to the drill holder, and it is known to accomodate a drill in a 90° V-shaped cutaway formed in the drill holder. Difficulties have been encountered, however, in providing drill holders including such cut-aways which possess the required rigidity to withstand the distorting and deflecting forces arising from the interaction of the drill and the metallic workpiece. The high speed demanded by the tool operation generates rapid vibrations which produce conditions leading the chattering with resulting inaccuracies.

The present invention is directed to overcome the drawbacks of prior art by providing a simple tool holder, e.g. a drill holder, which combines a rigid structure with versatility and adaptablity for tools of different diameters. The invention broadly secures any round stock tool, but for exemplification, reference will be made to drills.

More specifically, the drill holder according to the present invention includes a massive support block of substantially rectangular cross section, with a seating member which is inserted into the slot of a lathe turret and secured to the support block by a hexagonal nut. A hollowed-out portion of the support block has a quasi-cordate cross section in which the apex and the arcuate portion are horizontally related. The apex is disposed a predetermined distance, for most lathes 0.5 or 0.375 inch, above the bottom surface of the drill holder and is at the junction of two substantially straight surfaces which include an angle of 90°. The angle is disposed so as to be bisected by an imaginary horizontal line. An elongated drill, introduced into the hollowed-out portion of the drill holder and positioned in the wedge-shaped space formed by the surfaces including the 90° angle, therefore has the predetermined centerline above the bottom surface of the drill holder. This relation is invariant for drills of any diameter which can be accomodated in the cut-away portion of the drill holder in tangential position relative to the inclined surfaces extending away from the apex of the 90° angle.

A multiplicity of threaded bolts are extended toward the drill in the interior of the support block, at spaced intervals and normal to the drill axis, to secure the drill in its predetermined position with respect to the V-shaped part of the cut-away.

In a preferred embodiment the bottom surface of the drill holder distal to the V-shaped part of the cut-away, is dimensioned so as to be fractionally spaced, e.g. 0.010 inch, from the parallel plane top surface of the lathe turret, so as to enable spring-loading of the drill.

DETAILED DESCRIPTION

Figure 1:
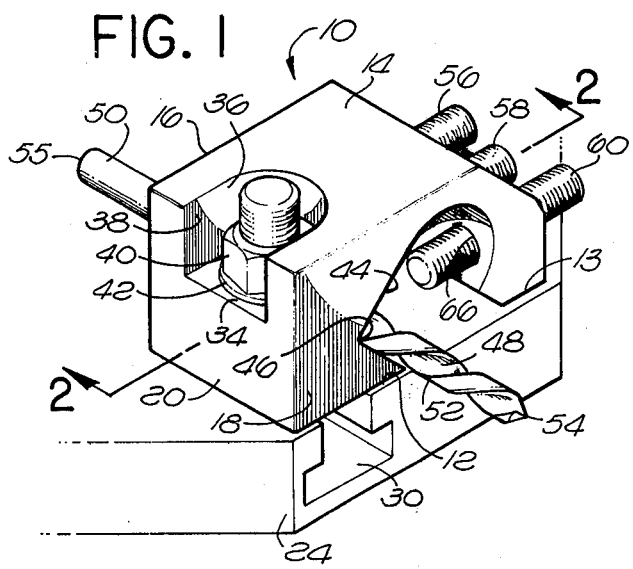
FIG. 1 is a perspective view of a drill holder in accordance with the present invention.

Referring to FIGS. 1-5, the drill holder includes a massive support block 10 of substantially rectangular cross-section which is formed by proximal and distal bottom surfaces 12 and 13, respectively, a parallel top surface 14, a pair of upright parallel side walls 16 and 18, a proximal end wall 20, and a distal end wall 22. The distal end wall 22 is formed with a vertical lower portion 23 joined to an inwardly slanting upper portion 25, as is more clearly seen in FIG. 2.

Figure 2:
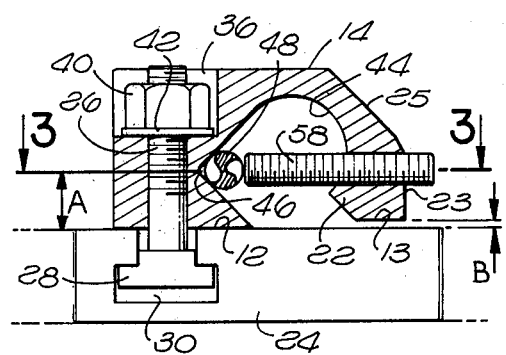
FIG. 2 is a cross-sectional view taken along the line 2—2 of FIG. 1.
Figure 3:
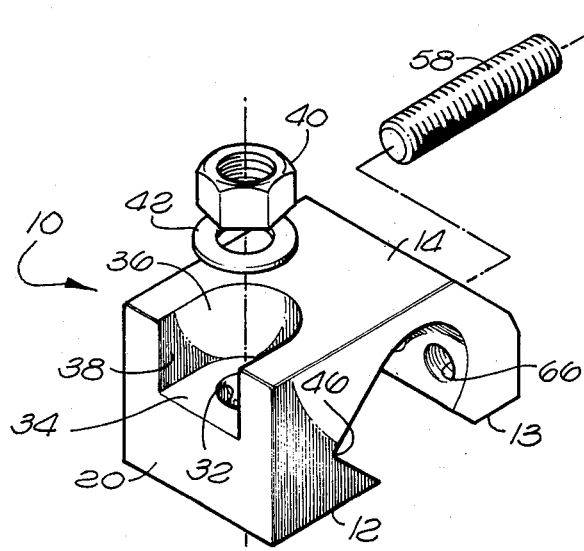
FIG. 3 is a cross-sectional view taken along the line 3—3 of FIG. 2.
Figure 5:
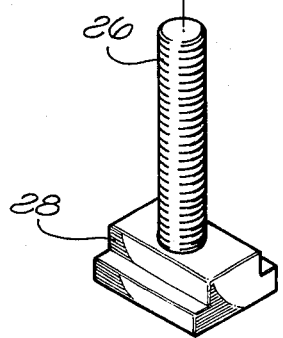
FIG. 5 is an exploded perspective view of the drill holder.

The drill holder is adapted to be mounted on a lathe turret generally designated by the numeral 24, by means of a threaded stud 26, anchored to a T-shaped base 28 which is slidably received in a T-shaped slot 30 provided therefor in the turret. The stud 26 is guided through a vertical bore 32 (FIG. 5) which extends upwardly through the drill holder from the proximal bottom surface 12, to a U-shaped plane 24 parallel thereto. The plane 34 forms the bottom of a cavity 36 extending downwardly from the top surface 14 and communicating with the exterior of the drill holder through a rectangular cut out section 38 at the upper end of the wall 20. As shown in FIG. 2, the upper end of the stud 26 is co-planar with the top surface 14 of the drill holder to which it is secured by means of a hexagonal nut 40 superposed on a washer 42. Tightening of the nut 40 against the plane 34 can be achieved either through the top or the side opening of the cavity 36.

A passage 44 of quasi-cordate cross-section is formed through the drill holder from one side wall 16 to the opposite side wall 18 and comprises, proximate to the bore 32, a V-shaped portion 46 including an angle of 90°. A drill 48 is horizontally positioned between the inclined surfaces of the portion 46 extending outwardly from the apex of the angle and having points of tangency relative to the circumference of the drill which are equidistant from its centerline. The centerline of the drill 48 coincides with the horizontal bi-sector of the 90° angle which is spaced a predetermined distance above the bottom surface 12 of the drill holder, as indicated by the arrows A in FIG. 2. To accomodate the customary lathe dimensions, the predetermine distance of 0.5 or 0.375 inch, but others are comprehended.

The drill 48 is formed of an elongated cylindrical rod 50, terminating in a spiralling portion 52, with a drill bit 54 at one end thereof. The symmetry of the V-shaped portion 46, and the arcuate shape of the passage 44 opposite the portion 46, enable drills of different diameters to be interchanged rapidly and easily in the proper center relation with respect to the portion 46, without the use of tool gages and other time and labor-consuming operations.

Figure 4:
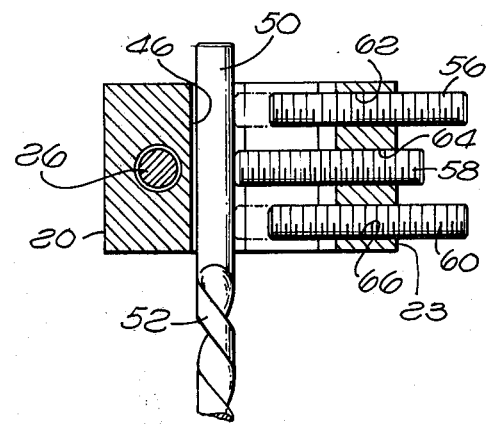
FIG. 4 is a rear elevational view of a part shown in FIGS. 1-3.

Three threaded bolts 56, 58 and 60 are admitted into the hollowed-out passage 44 through co-planar bore 62, 64 and 66 provided in the vertical portion 23 of the end wall 22 of the drill holder. The bolts 56, 58 and 60 are aligned normal to the axis of the drill 48 and are spaced from one another. They may be advanced individually and horizontally against the drill to precisely support it in the predetermined horizontal position, by turning, via an allen wrench. The recesses 68, 70 and 72 are disposed at their outer ends (FIG. 4).

The bottom surface 12, proximate the V-shaped portion 46, is planar and in flat contact with the top surface of the lathe turret 24. The distal surface 13 of the drill holder is dimensioned so as to be spaced fractionally from the top surface of the lathe turret, as indicated by the arrows B in FIG. 2, e.g. 0.010 inch. The spatial interval between the distal surface 13 and the top surface of the lathe turret enables spring loading of the drill. In this regard, the bolts 56, 58 and 60 are each threaded through the vertical wall to engage the drill 48 and as they are tightened the distal end wall is spring bent upwardly. The slanting portion is thinner than adjacent portions and provides spring-loading without distortion of the remainder of the tool. Thereafter, the outer bolts 60 and 58 can be loosened to leave the device disposed as in FIG. 3 whereby the entire spring force is concentrated at the proximal end of the center bolt 58. Such an arrangement permits a greater amount of spring loading than would otherwise be convenient and aids in resisting chattering.

Note that the provision of the studed base 28 secured by the washer-nut combination 40-42, permits the holder to be swiveled 180° respective a point on the turret surface. I claim:

1. A tool holder adapted for releasable mounting on a lathe turret including mean for horizontally supporting an elongated tool over a part of it length, comprising:
    a one piece housing formed with (a) a first plane bottom surface for flat connection to said lathe turret, (b) an interior wall surface defining a passage including, in cross section, a V-shaped portion at one end of said passage of serving as a seat for said tool and including an angle of 90° with a horizontally diposed bi-sector at a predetermined distance from said first bottom surface, (c) a distal bottom surface separated from said first surface by said passage and dimensioned to be fractionally spaced from the plane of said lathe turret to enable spring-loading of said tool supported in said housing, and (d) a vertical bore from said first plane bottom surface entirely through said housing for insertion of a stud therethrough for retention of the tool holder on said lathe turret; and
    means for securing said tool in said V-shaped portion whereby the centerline of said tool is disposed coincident with said horizontal bi-sector.

2. The tool holder of claim 1 in which said securing means includes a plurality of threaded bolts disposed in said housing at spaced intervals, normal to the axis of said tool and movable thereagainst, and means for moving said bolts relative to said tool.

3. The tool holder of claim 1 wherein said predetermined distance is 0.375 inch.

4. The tool holder of claim 1 wherein said V-shaped portion is bounded by an arcuate portion adapted to accomodate tools of different diameter in said alignment of their centerline with said horizontal bi-sector of said 90° angle.

5. The tool holder of claim 4 in which said arcuate portion is quasi-cordate.

6. The tool holder of claim 1 in which said fractional spacing is about 0.010 inch.

7. The tool holder of claim 1 in which said horizontally supporting means is formed to enable swiveling of said holder 180° respective a point on the turret surface.

8. A tool holder adapted for releasable mounting on a lathe turret including means for horizontally supporting an elongated tool over a part of its length, comprising:
    a housing formed with an interior wall surface defining a passage including, in cross section, a V-shaped portion at one end of said passage serving as a seat for said tool and including an angle of 90° with a horizontally disposed bi-sector at a predetermined distance from a bottom housing surface, a portion of said interior wall surface being distal from, and opposite to, said bi-sector and bored to receive a plurality of bolts therethrough for securing said tool in said V-shaped portion whereby the centerline of said tool is disposed coincident which said horizontal bi-sector, another portion of said interior wall surface extending from said distal wall surface around said passageway, a portion of said housing slanting exteriorly thereat, said slanting housing portion being thinner than adjacent portions whereby to permit spring loading of said tool.

* * * * *

UNITED STATES PATENT AND TRADEMARK OFFICE
CERTIFICATE OF CORRECTION

PATENT NO. : 4,054,066

DATED : October 18, 1977

INVENTOR(S) : Walter L. Carter

It is certified that error appears in the above-identified patent and that said Letters Patent are hereby corrected as shown below:

Col. 1, line 27, "the" should be --to--.

Col. 2, line 31, "24" should be --34--.

Col. 2, line 67, "bore" should be --bores--.

Col. 3, line 33, "mean" should be --means--.

Col. 3, line 34, "it" should be --its--.

Col. 3, line 39, delete "of" (second occurrence).

Col. 3, line 41, "diposed" should be --disposed--.

Col. 4, line 40, "which" should be --with--.

Signed and Sealed this

Seventh Day of February 1978

[SEAL]

Attest:

RUTH C. MASON
*Attesting Officer*

LUTRELLE F. PARKER
*Acting Commissioner of Patents and Trademarks*